April 18, 1961 GUSTAV-ADOLF SCHROETER 2,980,535

LIGHT SENSITIVE LAYERS OF SYNTHETIC MATERIALS

Filed Oct. 6, 1958

United States Patent Office 2,980,535

Patented Apr. 18, 1961

2,980,535

LIGHT SENSITIVE LAYERS OF SYNTHETIC MATERIALS

Gustav-Adolf Schroeter, deceased, late of Wesseling, Germany, by Christa B. E. Schroeter, widow and heir, Koln-Lindenthal, Germany, and legal representative of Udo Schroeter, Ivo Schroeter, Jonke Kai Schroeter, and Silvelin Schroeter, all of Koln-Lindenthal, Germany, heirs, assignor to Feldmühle Papier- und Zellstoffwerke Aktiengesellschaft, Dusseldorf, Germany, a corporation of Germany Filed Oct. 6, 1958, Ser. No. 765,671

5 Claims. (Cl. 96—35)

The invention relates to a composition of matter, and more particularly to light-sensitive layers of synthetic materials, which are useful in printing and photo-technique procedures.

This application is a continuation in part of copending application Serial No. 402,403, filed January 5, 1954, and entitled "Film-Forming Polymers."

It is well known that in some high-polymeric synthetic materials, changes can be caused by the action of light, e.g. rubber hydrohalides become brittle and turn yellow in daylight. It has also been proposed to utilize this light-sensitiveness for technical purposes. However, it was found that the light-sensitiveness necessary for practical use could only be attained by admixture therewith of special sensitizers with which the light-sensitiveness of the synthetic materials was so increased that after an exposure within practical limits, the exposed portions of a layer of such a material differ so much in their solubility, or capability of swelling, or of being wetted, from the non-exposed portions that the layers could be used in printing and photo-technique. As additive substances for increasing the light-sensitiveness, organic bodies were proposed which contain at least three linearly connected rings, as e.g. anthracene, benzanthrene, acridine, and phenazine, and substitution products and derivatives thereof. Also, light sensitive films have been produced which contained a light-sensitive material embedded in a film forming matrix. However, films of these types have presented many disadvantages. For example, such films have not shown satisfactory resistance to aging, their light-sensitivity decreasing to objectionably low amounts upon storage, thus necessitating their use, if at all, as freshly prepared films. Some action of the components upon each other appears to be responsible for such accelerated deterioration of light-sensitivity. Such films also present difficulties in distribution of the light-sensitive material or the sensitizer throughout the film which has tended to deter commercial adoption of such films.

It is an object of the invention to provide a composition of matter which is an improvement over light-sensitive materials previously employed and hereinabove mentioned and to overcome disadvantages inherent in the use of films which have heretofore been proposed.

A further object is to provide a process for production of such improved light-sensitive films.

Other objects of the invention will in part be obvious and will in part appear hereinafter.

The light-sensitive composition of this invention in contradistinction to light-sensitive films of the prior art, comprises a chemically unitary sensitized light-sensitive film. It comprises film forming polymeric material having chemically joined thereto radicals containing at least three coordinately connected carbocyclic or heterocyclic six-membered rings. Hence, in the light-sensitive composition according to the invention, the cyclic radicals are chemically combined with the polymeric film-forming compounds whereby novel film-forming compounds with high light-sensitivity and marked stability against deterioration on aging are provided. Such light-sensitive film-forming compounds are adapted to advantageous use in the printing and photographic arts. They are highly and uniformly sensitive to light and particularly so to light in wave lengths of the ultraviolet spectra. Objective manifestations of the effect of such light upon these film-forming compounds may advantageously be utilized in the printing and photographic arts. Such objective manifestations include changes in solubility and capability of swelling or being wetted in the presence of suitable liquids upon being subjected to activating wave lengths of light. Thus, upon exposure to activating light of films comprising such compounds, practical advantage may be taken of the differential solubilities, capabilities of swelling, or capabilities of being wetted of the exposed and non-exposed portions of the layer in the manufacture of printing or photo-engraving plates, photographic films and the like. Such films may also be employed in the production of desired resist areas useful in the etching and dying arts.

The compositions of this invention are prepared by chemically reacting a film-forming polymeric material with a compound containing at least three coordinately connected six-membered carbocyclic or heterocyclic rings. It is necessary only that such carbocyclic or heterocyclic ring compounds contain an alpha, beta, or gamma substituent capable of reacting with one or more substituents in the polymeric compound. However, a substitutent in the gamma or mesoposition is preferred.

As used herein, the term coordinately connected six-membered rings refers to the anthracenic structure:

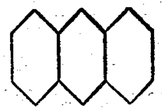

wherein the rings may be either carbocyclic or heterocyclic.

Hence, in the light-sensitive layers or films according to the invention, the cyclic substances are chemical components of high polymer compounds whereby novel film-forming substances with high-sensitiveness to light are provided. Compounds of this invention may be produced from linear polymers having a substituent capable of reacting with a substituent on the three ring cyclic compound, for instance a polymeric substance the chains of which contain hydroxyl groups such as polyvinyl alcohol, or cellulose. In such substances, the mentioned sensitizing compounds may be chemically reacted with the hydroxyl group by well known processes. In this manner the new synthetic substances result which as light-sensitive layers or films can be used in many ways for the purposes of printing and photo reproduction. The particular advantage of these films or layers consists in that the new substances, generally, when kept in the dark are stable during storage and can easily be of such a composition that they do not react with metals. Hence, it is possible to furnish e.g. the cliche-maker or the offset printer with metal plates coated ready for use, and thus obviating a difficult operation, whereas in the conventional processes the printing plates had to be coated in the cliche-making plant or printing plant because of the relatively limited stability in storage of the dried films spread on the plates.

Thus, as stated hereinabove, the present invention consists of a light-sensitive photographic element which comprises a support with two opposing surfaces. One of these surfaces is coated with a layer of a material consisting of the reaction product of an organic linear polymer having, in its molecule, reactive groups such as hydroxyl groups and carboxyl groups, for instance, of a linear polymer such as polyvinyl alcohol, cellulose, and partially acylated polyvinyl alcohol or cellulose, with an aromatic organic compound having at least three ortho-condensed six-membered rings in linear arrangement which aromatic organic compound carried groups that are capable of reacting with the reactive groups of the polymer, such as the aldehyde group, the halogens chlorine and bromine, the carboxyl group, the hydroxyl group, the sulfo group, the mercapto group, the isocyanate group, and a reactive amino group. Such aromatic organic compounds having at least three ortho-condensed six-membered rings in linear arrangement are compounds, for instance, with an anthracene, acridine, benzopyrene, phenazine, phenanthrophenazine, benzanthrene, or the like, ring system. Such reaction products of polymer and organic compound are the sole light-sensitive components of said light-sensitive photographic elements and are soluble in and, thus, can be removed from the support by treatment with an organic solvent.

As stated hereinabove, the present invention in principle, refers to a light-sensitive layer which contains a condensation product having, as the one principal component, a film-forming polymer and, as the other principal component, an organic compound having at least three ortho-condensed six-membered rings in linear arrangement which per se is dimerizable by the action of light and which is chemically bound and attached to the polymer by suitable chemical groups, such as ester, acetal, acid amide, or other groups. Said polymer component imparts to the light-sensitive layer the film-forming properties while the organic compound imparts thereto the light-sensitivity.

There are two principal ways of chemically linking the organic compound having at least three ortho-condensed six-membered rings in linear arrangement with the polymer which may be schematically illustrated by the following formulas. In said formulas C indicates carbon members of the polymer chain, A indicates the radical of the organic compound while X indicates the linking group.

I. The radicals of the organic compound are attached to the polymer chain:

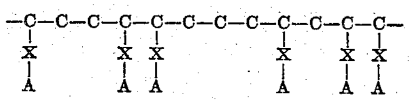

II. The radicals of the organic compound are intercalated in the polymer chain:

—C—X—A—X—C—C—C—X—A—X—C—X—A—X—C—C—

The radical of the organic compound A having at least three ortho-condensed six-membered rings in linear arrangement need not be attached or, respectively, catenarily linked to the carbon atoms of the polymer chain in a regular manner, but, as is evident, the linkages between compound A and carbon atoms C may preferably be arranged at random and irregularly. It is, of course, understood that the carbon atoms C, as well as the radical of the organic compound may have attached thereto other suitable substituents.

Especially suitable polymers are (*a*) Polymers of the polyvinyl type, such as polyvinyl alcohol, polyvinyl acetals, polyvinyl acetates, polyacrylic acid and its esters, polymethacrylic acid and its esters, polyvinyl chloride, polyvinylidene chloride, and the like polymers and their mixed polymers;

(*b*) Cellulose and cellulose derivatives, such as acetyl cellulose, cellulose propionate, cellulose butyrate, cellulose aceto-butyrate, nitro cellulose, and other cellulose derivatives which contain free hydroxyl groups;

(*c*) Polyester or polyamide polymers such as the polycaprolactames, the polymethylene diamine-polycarboxylic acid polycondensation products, the terephthalic acid glycol ester polymers, the polyurethanes, and the like polymers. This last mentioned group is especially suitable for the preparation of the light-sensitive layers according to the above given Formula II by replacing part of the dicarboxylic acid, polyalcohol, diamine, or, respectively, diisocyanate by a suitably substituted organic compound having at least three ortho-condensed six-membered rings in linear arrangement;

(*d*) Copolymers of unsaturated hydrocarbons with other unsaturated compounds, such as vinylacetate, acrylic esters, and the like compounds.

The other reaction component may be a suitable derivative of a dimerizable aromatic or heterocyclic compound having at least three ortho-condensed six-membered rings in linear arrangement. One of said rings may be a heterocyclic ring. Such compounds belong, for instance, to the following type of compounds:

(*a*) Anthracene compounds with the ring system

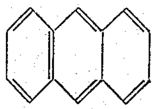

(*b*) Naphthacene (benzanthrene) compounds with the ring system

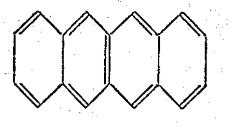

(*c*) Cholanthrene compounds with the ring system

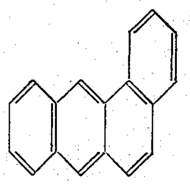

(*d*) Benzopyrene compounds with the ring system

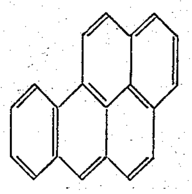

(*e*) Acridine compounds with the ring system

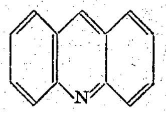

(*f*) 1-azaanthracene and 2-azaanthracene compounds with the ring system

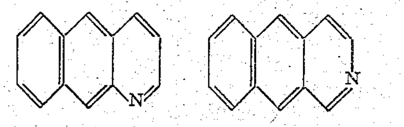

(*g*) Phenazine compounds with the ring system

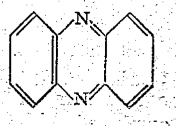

(*h*) Phenanthrophenazine compounds with the ring system

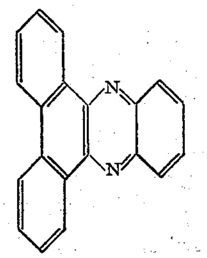

Reactive derivatives of other organic aromatic and heterocyclic compounds having at least three ortho-condensed six-membered rings in linear arrangement which are dimerizable under the influence of actinic rays may, of course, also be used for making the photosensitive layer according to the present invention.

The reactive groups present in said organic compounds must not interfere with their dimerization. The following groups have proved to be especially useful:

(*a*) Alcoholic or phenolic hydroxyl or mercapto groups. These groups are capable of forming esters with polymers having free carboxyl groups, acetals or mercaptals with polymers having free aldehyde groups, urethanes with polymers having free isocyanate groups. They may also be used for transacetalization or transesterification reactions with polymers having acetal, or, respectively, ester groups with lower alkanols in which said lower alkanol radical can readily be exchanged by the alcohol or, respectively, phenol radical of the dimerizable organic compound with at least three ortho-condensed six-membered aromatic or heterocyclic rings.

Examples of suitable compounds of this type are, for instance, anthranol or 9-hydroxy anthracene, 1,8-dihydroxy anthranol, 9-hydroxy methyl anthracene, 1- or 2-methyl anthranol, acridyl ethanol, acridyl trimethylene glycol, 2,3-dihydroxy phenazine.

These compounds react, for instance, with polyvinyl butyral whereby partial or complete transacetalization takes place. They may also react with various diisocyanates, such as 1,6-hexane diisocyanate, and especially anthranols containing at least one additional hydroxyl group. They may form polyester-like products, for instance, with maleic acid or phthalic acid and may form photosensitive polycondensation products, preferably in mixture with other alcohols.

(*b*) Groups of the general formula

wherein R indicates hydrogen, the hydroxyl group, the alkoxy group, or halogen. Such compounds, thus, represent aldehydes, carboxylic acids and their esters and acid halides. The aldehydes are preferred reaction products. They readily form acetals, for instance, with polyvinyl alcohol or by partial or complete transacetalization with polyvinyl acetals, such as polyvinyl butyral and the like compounds.

Especially suitable aldehydes of the organic compounds having at least three ortho-condensed six-membered rings in linear arrangement are 9-anthracene aldehyde, 9-acridine aldehyde, anthracene-1-aldehyde-9-carboxylic acid.

The preferred photosensitive film-forming material of this group as it is to be used according to the present invention is the acetal obtained either by reacting polyvinyl alcohol with 9-anthracene aldehyde or by transacetalization of polyvinyl butyral with 9-anthracene aldehyde.

Especially suitable carboxylic acids of such organic compounds are, for instance, 9-anthracene carboxylic acid, 2-anthracene monocarboxylic acid, acridine-9-carboxylic acid, anthracene propionic acid, 1,2- or 3,4-benzoacridine-9-carboxylic acid.

These carboxylic acids are either used as such or in the form of their acid halogenides for esterification of hydroxyl group containing polymers such as polyvinyl alcohol, cellulose, cellulose esters, and the like. They can also be used in the form of their lower alkyl esters for transesterification with esters of such hydroxyl group containing polymers.

The preferred acids, acid esters, and acid chlorides useful for the purpose of the present invention are 9-anthracene carboxylic acid and 2-anthracene carboxylic acid in the form of the free acids, their lower alkyl esters, and their acid chlorides.

(*c*) Primary or secondary amino groups or the isocyanate group. Primary diamino compounds are useful as reactants to partly replace, for instance, hexamethylene diamine and other diamines in their reaction and polycondensation with the ordinarily used dicarboxylic acids such as adipic acid, sebacic acid and the like. The preferred amino compounds of this type are 1,4-diaminoanthracene, 3,6-diamino phenazine.

Isocyanates of the dimerizable organic compounds can be used with hydroxyl group containing polymers to attach such organic radicals to the polymer molecule by interposition of a urethane group between the polymer chain and the organic radical.

(*d*) Another group which is useful in the preparation of photosensitive layers according to the present invention is the sulfonyl group of the formula

wherein R indicates the hydroxyl group, the lower alkoxy group, and halogen. Such compounds are also used for esterification in about the same manner as the compounds with the carboxyl group. Suitable representatives of this group of compounds are, for instance, anthracene-9-sulfonic acid, anthracene-1- or -2-sulfonic acid, anthracene-1,8-, -1,5-, -2,7- or 2,6-disulfonic acid.

(*e*) Halogen substituted organic compounds may also be used as the one reaction component. For instance, 2,9,10-trichloro anthracene has proved to combine with the sodium or silver salts of polymers which contain carboxyl groups, for instance, with polyacrylic acid salts. Other compounds of this type are, for instance, 1- or 2-chloro anthracene, 1,4-, 1,5-, 1,8-dichloro anthracene, 1,5-dichloro-9-chloro methyl anthracene, 9-, or 4-chloro acridine.

(*f*) Organic compounds which are substituted by vinyl groups, such as 9-vinyl anthracene may also be employed, for instance, to produce copolymers with styrene, 2,4-dichloro styrene, vinyl chloride, vinyl acetate, and the like compounds. Other copolymerizable organic compounds having a vinyl radical in their radical, and being useful for the purpose of the present invention, are, for instance, acridyl-9-acrylic acid.

It is evident that the present invention is based on the fact that highly photosensitive layers can be obtained when chemically linking to each other a film-forming polymer and an organic compound which is dimerizable by the action of light and which contains at least three ortho-condensed six-membered aromatic or heterocyclic rings in linear arrangement, for instance, by interposition of an acetal, carboxylic or sulfuric acid ester, carboxamido(—CO—NH—), hydrocarbon, or the like linking group. The resulting photosensitive layer must furthermore still be soluble while the layer, after exposure to actinic rays must be rendered insoluble, or, at least, must be so considerably reduced in its solubility that removal of those parts of the photosensitive layer which were not exposed to actinic rays by the action of suitable solvents is possible.

Since certain photoreproduction techniques make use of the higher or lower swellability or wettability of the photosensitive layer, it is also possible to use photosensitive layers according to the present invention which are rendered less wettable or swellable by the action of actinic rays than unexposed parts of such layers and which need not be completely removed from the layer after exposure and for reproduction of the image. Thus, when using hereinafter and in the claims the terms "soluble" and "solubilizing" or "insoluble" and "rendering insoluble," these terms are also used to indicate the changes in wettability or swellability which are produced by the action of actinic light. The important and characteristic feature of the present invention is to be seen in the provision of a photosensitive layer containing as the sole photosensitive chemical compound a polymer, the solubility, wettability, or swellability of which is changed by exposure to actinic rays in the absence of any photosensitive silver compound or any photosensitizing metal compound such as chromium compounds and the like.

In general, the photosensitive layer may be employed in any of the photoreproduction techniques known to the art. For instance, according to the letter press printing process the photosensitive layer may be applied to a metallic support. Those parts of the layer which are then exposed to the action of actinic rays are rendered insoluble or much less soluble than the unexposed parts. Said unexposed, readily soluble parts are subsequently removed by treatment with a solvent. The support is thereafter etched or otherwise treated at the areas not covered by the insoluble or less soluble parts of the layer, also called the resist image. After etching or other treatment said resist image is usually removed, leaving a printing plate with a raised image. On inking the raised parts of the printing plate and printing with said inked plate, the image is transferred to the paper or other material to be printed.

To produce an engraved or intaglio print, the metal plate, after removing the exposed resists, is inked so that the printing ink covers the entire surface of the plate and fills also the etched hollows. The surface of the plate is then cleaned off, leaving only the hollows filled with ink, which is lifted out from said hollows when paper is pressed into contact with the thus prepared plate.

According to another method, flat printing is carried out, for instance, by subjecting the metal plate, after removal of the soluble unexposed layer, to an electroplating process. Thereby, a thin layer of another metal is deposited in the non-exposed areas of the plate. After removing the resists, a plate results which either accepts the ink at the electroplated areas while the non-electroplated areas repel the same, or vice versa, depending on the type of metal used for the support and in the electroplating process. The plate with the electroplated areas is then inked. On contact with paper the ink is transferred to the paper.

Of course, other printing methods than the above described intaglio printing method, the relief or letter press printing method, or the surface or planographic printing method or variations of said printing methods may be used likewise. Thereby, use may also be made of the differences in swellability of wettability caused by exposure to light.

The various printing processes by means of photosensitive layers according to the present invention are illustrated in the accompanying drawings without, however, limiting the same thereto. In these drawings there are shown, in greatly enlarged cross-sectional view, the structure of representative photosensitive elements of the present invention at various stages of preparing the printing plate and of printing therewith.

Figs. 1 to 7 illustrate the procedure followed in relief or letter press printing;

Figs. 1 to 5, 8 and 9 illustrate the procedure followed in intaglio printing; and Figs. 1 to 3 and 10 to 13 illustrate the procedure followed in flat or lithographic printing.

Figures 1, 2, 3, 4, 5, 6, 7, 8, 9, 10, 11, 12, 13:
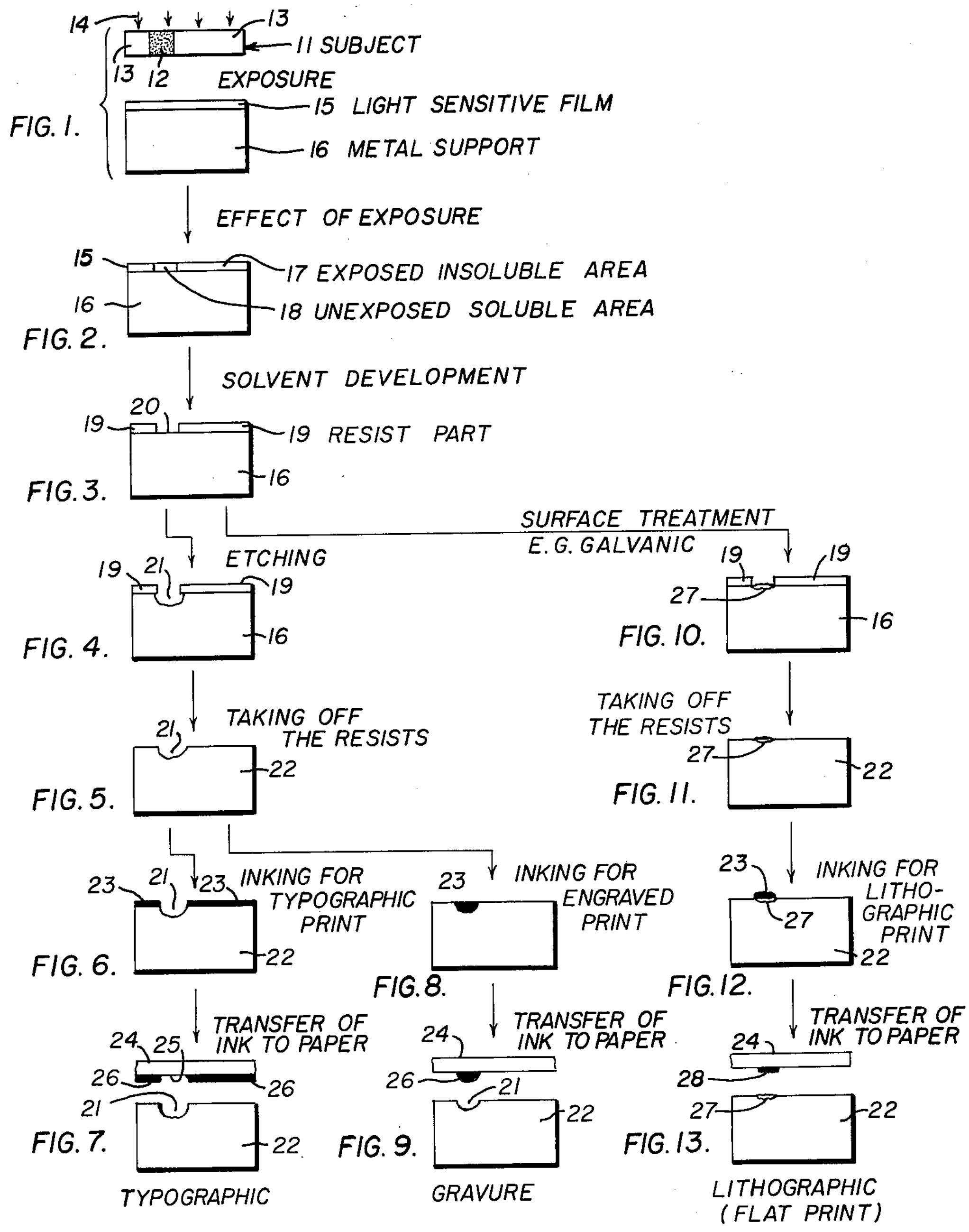

Fig. 1 shows the subject 11 to be reproduced, such as a photographic negative with an area 12 of substantially no light transmissivity and areas 13 of considerable light transmissivity. Light rays 14 pass through said areas 13, but not through area 12, and photosensitive film layer 15 which is readily soluble in a suitable solvent and which is provided on metal support 16. The photosensitive film layer 15 is composed as described hereinafter in the examples. Metal support 16 may be a zinc, copper, or the like plate.

Fig. 2 shows the effect of such exposure on photosensitive film layer 15. Areas 17 have been exposed to light rays 14 while area 18 has not been exposed thereto. Due to the action of light rays 14, the solubility of areas 17 has been reduced while that of unexposed area 18 has not changed.

The exposed photosensitive film layer 15 on metal support 16 is then treated with the solvent whereby only the unexposed soluble area 18 is dissolved while the exposed areas remain as resists 19. As a result thereof part of the surface 20 of metal support 16 is bared as shown in Fig. 3.

Metal support 16 with resists 19 is now subjected to an etching treatment whereby surface area 20 is attacked by the etching agent leaving etched hollow 21 as illustrated in Fig. 4.

After removing the resists 19, for instance, by rubbing, brushing, or the like treatment, printing plate 22 is obtained wherein the dark part of the negative subject 11 is reproduced as etched hollow 21; see Fig. 5.

Fig. 6 illustrates the inking of the resulting printing plate 22 with ink 23 preparatory to printing, while Fig. 7 shows the transfer of ink 23 from printing plate 22 to paper 24 whereby the etched hollow 21, due to the absence of ink, leaves area 25 of paper 24 free of ink. In this manner inked areas 26 on paper 24 are a positive reproduction of the negative subject 11.

In intaglio printing the procedure is the same as illustrated in Figs. 1 to 5. The surface of printing plate 22 is then covered completely with ink 23 which also fills said hollow 21. By scraping or other means the surface of printing plate 22 is cleaned of ink while hollow 21 remains filled with ink as shown in Fig. 8.

Fig. 9 illustrates the transfer of ink 23 from hollow 21 to paper 24 where it forms raised image 26 of subject 11. It is evident that, when proceeding in this manner, not a negative subject 11 is used but a positive subject and that said positive subject 11 is directly reproduced on paper 24 as an engraved print.

To produce a flat print of positive subject 11, the procedure is followed as illustrated in Figs. 1 to 3. Thereafter, metal support 16 with resists 19 is subjected to a surface treatment, for instance, to an electroplating process whereby the bared surface 20 of metal support 16 is provided with a thin metal layer 27 of greater affinity to fatty ink than possessed by the metal of support 16. This is illustrated in Fig. 10.

By taking off resists 19 printing plate 22 with electroplate area 27 is obtained as shown in Fig. 11.

Fig. 12 illustrates the inking of said printing plate 22 by ink 23 while Fig. 13 illustrates the transfer of ink 23 from printing plate 22 with electroplated area 27 to paper 24. The printed area 28 represents a reproduction of positive subject 11, i.e. of its area 12 of low light transmissivity.

In this process the metal of which metal support 16 is composed may have a greater affinity to fatty ink than the metal covering the electroplated area 27. In this case subject 11 must, of course, be a negative of the image to be reproduced and image 28 on paper 24 will then be a positive reproduction of said original image.

It is understood that half-tone prints may also be produced with photosensitive elements according to the present invention. It is then only necessary to arrange a screen in the customary manner between subject 11 and photosensitive film layer 15.

In place of metal support 16 there may be employed other supports, for instance, supports of paper, plastic, glass, or other material.

When making use of the differences in swellability caused by exposure to actinic rays 14, the photosensitive film layer 15 is treated, after exposure and reducing the swellability of the exposed areas 17, with a swelling agent which contains a dyestuff. Said swelling agent and dyestuff are adsorbed only by the non-exposed areas 18 of the photosensitive layer while the exposed areas remain dyestuff-free. It is possible in this manner to produce colored reproductions of subject 11 when using as support 16 paper. With glass plates as support, diapositives can be obtained.

When adding to the swelling agent a substance which is capable of affecting the surface of a lithographic stone or slate or a metal plate 16 and of changing thereby the affinity of its surface to soapy or fatty printing ink, it is sufficient to simply press the exposed photosensitive layer 15 treated with such a swelling agent upon the stone or metal plate 16 whereby, after sufficient contact, a printing plate 22 is obtained as it is shown in Fig. 11.

If the action of the actinic rays 14 causes differences in wettability only, exposed photosensitive film layer 15 as shown in Fig. 2 can directly be used as printing plate by using a printing ink that adheres to the unexposed wettable areas 18 but not to the exposed areas 17. Such a printing plate 16 provided with the exposed layer 15, however, does not have the long service life as a metal or stone printing plate 22 shown in Fig. 11.

It is understood that any suitable type of solvent swelling or wetting agent may be used. The proper solvent or solvent mixture or wetting or swelling agent is selected in accordance with the respective properties of the polymer used and can readily be determined by preliminary routine tests, if required.

Photosensitive layers according to the present invention have the great advantage over similar known layers that they are stable, even on prolonged storage. The new photosensitive polymers do not show aging, i.e. decrease in light sensitivity on storage. They are not affected by moisture since the photosensitive component forms an integral part of the film-forming polymer. They can be converted into very thin films without any change in their properties. They do not always require a support but may form self-supporting films. Since they can readily be composed of film-forming polymers that do not affect metal supports, it is possible, as stated hereinabove, to supply the printer with metal plates coated with the new photosensitive polymer which he may store for a prolonged period of time. Thereby, the printer is saved the time and work heretofore required to coat the metal plates with a photosensitive layer.

It is, of course, understood that the preparation of the photosensitive polymer as well as the processing of such a polymer, such as its conversion into a film or coating on a support is carried out in the absence of actinic rays. However, preparation of the film casting solution does not require absolute exclusion of actinic rays provided the solution is filtered before the film is cast. Such filtration removes any particles of polymer which might have been rendered insoluble by the action of such rays. Film production, coating, and storage, however, require complete absence of light or the use of red light as customary in the photographic industry.

It has been found that the solubility of the photosensitive polymer may be varied and the differences in solubility between the unexposed and the exposed polymer may be enhanced considerably by converting reactive groups which are not linked to the anthracene and the like organic compounds into unreactive groups. For instance, the free hydroxyl groups in the polyvinyl alcohol-9-anthracene aldehyde condensation product may partly or completely be esterified by acetylation. Such acetylation considerably increases the solubility of the non-exposed condensation product over that of the product exposed to actinic rays and permits to use commercial solvents for dissolving the unexposed material without affecting the exposed material even if exposed to light for a short period of time only.

The following examples serve to illustrate the present invention without, however, limiting the same thereto.

*Example 1*

24.4 g. of a 25% aqueous solution of polyvinyl alcohol are mixed, with heating to 75° C., with 240 g. of glacial acetic acid to form a clear solution. In the hot solution, 12 g. of 9-anthracene-aldehyde are dissolved and thereafter 2.2 g. of concentrated sulfuric acid diluted with about 5 g. of glacial acetic acid are added as a catalyst. After half-an-hour stirring while warm, the solution is cooled and diluted with methanol. The precipitated product is filtered, freed from unreacted aldehyde by washing with methanol and ether, and stored protected against light. During the reaction not all the hydroxyl groups of the polyvinyl alcohol are acetalized. In order to increase the solubility of the reactive product, 30 g. thereof are dissolved in 600 cc. of pyridine. 140 cc. of acetic acid anhydride are added to the resulting solution and the mixture is heated to 80° C. for about 3 hours. The reaction mixture is then gradually added to about 3000 cc. of ice water while stirring vigorously. The acetylated polymer acetal precipitates in the form of flakes which are filtered by suction, washed with methanol and ether, and carefully dried with the exclusion of light. A white product is obtained which is readily soluble in chlorinated aliphatic hydrocarbons containing at least one unsubstituted hydrogen, such as chloroform, 1,2-dichloro ethylene, dichloro methane, trichloro ethylene, tetrachloroethylene, and the like, in aromatic hydrocarbons, such as benzene, toluene and the like, and in chlorinated aromatic hydrocarbons such as chloro benzene, and the like. Petroleum hydrocarbons, such as benzine, petroleum ether, and the like, as well as ether and ethanol do not dissolve the polymer. Acetone and other aliphatic ketones cause only swelling.

Although it is, of course, not possible to exactly illustrate the reaction taking place on acetalization and subsequent acetylation of polyvinyl alcohol, the following equation may be given to indicate the manner in which linking of the two reactants may proceed:

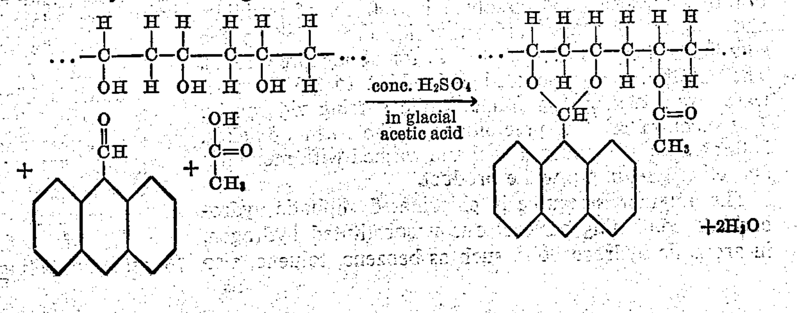

Films can be cast in the conventional manner on suitable supports, such as metal, glass, paper, cellulose acetate base, and the like, for instance, from a 3% solution in trichloro ethylene and, if desired, can be stripped from such supports. Exposure of such films to light under a partly transparent positive or negative renders the film insoluble in trichloro ethylene at the exposed areas while the non-exposed areas remain soluble therein.

*Example 2*

A paste is made of 25 g. of polyvinyl alcohol in as little water as possible. More water is gradually added to said paste while stirring and heating on a water bath to about 80° C. to yield a clear solution which is made up with additional warm water to yield 100 g. of an aqueous 25% polyvinyl alcohol solution. This solution jellies on standing at room temperature and becomes turbid but can again be liquefied by heating and stirring. 650 cc. of acetic acid preheated to 60° C. are admixed gradually by means of a dropping funnel to 100 g. of said 25% polyvinyl alcohol solution while stirring and heating on a steam bath. The speed of adding the acetic acid is so adjusted that no precipitation occurs (which is irreversible). On cooling the reaction mixture, a gel is formed which does not clear when heated. 34 g. of 9-anthracene aldehyde is dissolved. Then at about 65°–70° C., 4.5 cc. of concentrated sulfuric acid in 30 cc. of acetic acid are added with stirring. Thereupon the mixture is removed from the water bath and immediately cooled with ice water while stirring is continued until a fine yellow product precipitates. This product is filtered on a Buchner funnel and washed with methanol and, thereafter, with ether. Thereby, excess aldehyde is removed and the product becomes almost white. On standing and drying in the open air, the product again turns somewhat yellow. The thus prepared polymer is insoluble in water and organic solvents, and is acetylated by means of acetic acid anhydride in pyridine solution. For this purpose, it is dissolved in 500 cc. of pyridine, and 120 cc. of acetic acid anhydride are added to the solution which is heated at 80° C. for about three hours. The solution is then cooled and added to 3.5 liters of water from a dropping funnel while stirring vigorously. The reaction product precipitates in the form of flakes, is filtered on a Buchner funnel and washed with methanol and ether, yielding a white product.

The polymer is soluble in chlorinated aliphatic hydrocarbons containing at least one unsubstituted hydrogen, in aromatic hydrocarbons, such as benzene, toluene, also in chlorinated aromatic hydrocarbons, such as chloro benzene. Benzine, ether and alcohol do not dissolve the product, and other organic solvents, such as acetone, only swell the same.

Films are prepared in the conventional manner from a 4% solution in trichloroethylene which has been filtered, for instance, through cotton. When such a film is exposed to light from an arc lamp (12 amp.) under a negative (minimum exposure time: 15 seconds to 30 seconds) the film becomes insoluble in trichloro ethylene whereas its non-exposed portions remain soluble therein.

The reaction yielding the the polymer according to Example 2 may be illustrated by the following equation:

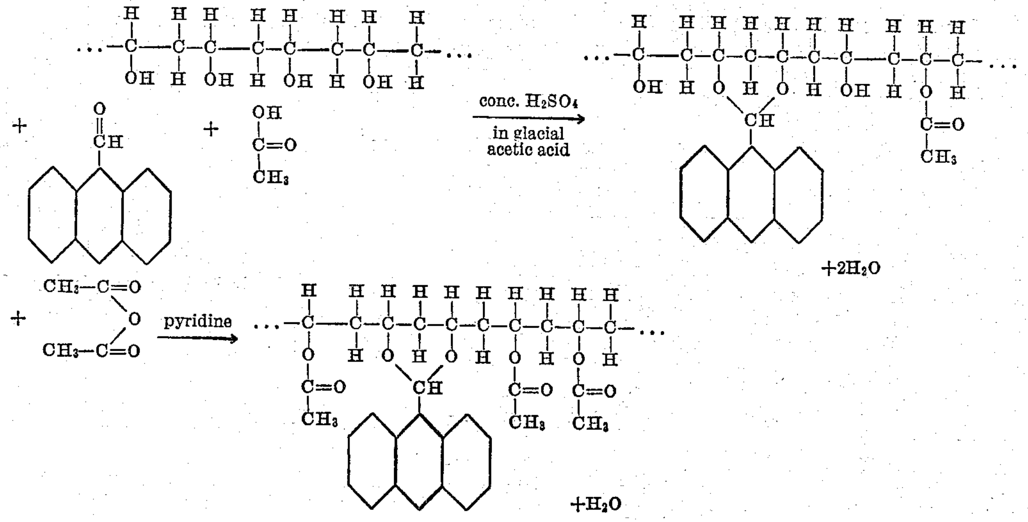

*Example 3*

10 g. of commercial polyvinyl acetate are dissolved in 80 cc. of absolute methanol. 5 g. of 9-anthracene aldehyde are added to said solution which is then heated under reflux on a water bath while stirring. As soon as the aldehyde is dissolved and the solution is heated to boiling, 5 cc. of fuming hydrochloric acid are added as reaction catalyst. The reaction mixture becomes turbid after about 20 minutes whereupon 2 cc. of toluene are added to eliminate the turbidity. On continuing heating under reflux, the mixture becomes again turbid after a few minutes and the turbidity is again eliminated by the addition of 2 cc. of toluene. This addition of 2 cc. of toluene is repeated to eliminate any turbidity until all in all 20 cc. of toluene are added. Thereupon, the turbidity increases and the acetylated polyvinyl acetate conglomerates. The solvent mixture readily separates from said polymer. Thereafter, pyridine (about 2.5–3.0 cc.) is added to the mixture with stirring in order to neutralize the hydrochloric acid, and the neutralized mixture is cooled. The solvent is removed by decanting. The remaining polymer is triturated with methanol to remove most of the unreacted aldehyde.

The methanol triturated polymer is dissolved in 35 cc. of pyridine to which 25 cc. of acetone are added. The solution is added drop by drop to water whereby a straw-like precipitate is obtained which is comminuted by means of a disintegrator. The resulting finely granular product is dried. Any unreacted aldehyde present therein is removed by extraction with ether. During all these procedures and manipulations care must be taken that actinic light, i.e. light of short wave length within the visible spectrum, and light of still shorter wave length be excluded.

The following equation illustrates schematically the reaction taking place when carrying out this example.

It is evident that thereby part of the acetoxy group are saponified prior to the acetylation.

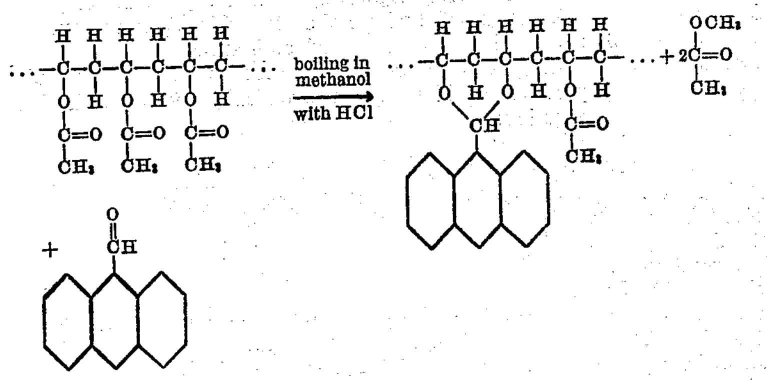

acteristic absorption curve having 3 maxima in the wave length range between 340 mμ and 400 mμ. The polylmers To convert said photosensitive polymer into a photosensitive element comprising a support and the photosensitive layer, solutions of the polymer are prepared, for instance, in a mixture of ethylene glycol mono-ethyl ether and toluene (1:1) or, respectively, in a mixture of chloro benzene, ethylene glycol mono-ethyl ether, and ethylene glycol monomethyl ether (20:9:7) containing about 4% of the polymer. Said solutions are uniformly and evenly distributed over the support in a centrifugal device in such a manner that the support is coated with a film of said polymer after evaporation of the solvent.

On exposure to light of the thus coated support under an image negative or positive, the polymer film is rendered insoluble in said solvents at the exposed areas while the non-exposed areas remain insoluble therein, thus permitting development of the image by means of the above given solvent mixtures.

The theory is advanced, although the effect of irradiation by means of actinic rays upon films composed of polymers according to the present invention is not limited to such a theory, that such irradiation is a photo-reaction whereby the anthracene and the like components of the polymers are chemically changed. Apparently said anthracene and the like components react with themselves, thereby causing formation of dianthracene or other dimeric groups. Such a formation of dianthracene or other dimeric groups of the originally linear polymer causes interlinking of the linear polymer chain and, as a result thereof, renders the polymer insoluble or, respectively, nonswellable or non-wettable.

That a chemical reaction takes place on exposure to actinic rays can be demonstrated by observing the absorption curves or, respectively, the extinction curves on irradiation with ultraviolet light. Anthracene as well as all the anthracene, acridine, phenazine, and the like compounds which are affected by actinic rays, exhibit a characteristic absorption curve having 3 maxima in the wave length range between 340 mμ and 400 mμ. The polylmers according to the present invention which contain anthracene and the like compounds chemically linked thereto show clearly the same maxima and the same characteristic absorption curve while the other components of such polymers do not exhibit any appreciable absorption within said range. When observing the absorption curves of the polymers according to the present invention under the influence of light, the maxima of the curves become lower and lower and, finally, disappear almost completely when exposing the film to such actinic rays for a prolonged period of time. It is thus possible to measure and determine the speed at which the photo-reaction proceeds. This method can also be employed to determine whether a compound of the anthracene, acridine, phenazine, and the like series is suitable for the purpose of the present invention and, more particularly, to select the most effective compounds of this type.

*Example 4*

50 g. of polyvinyl butyral are dissolved in 500 cc. of methanol. 25 g. of 9-anthracene aldehyde and 20 cc. of fuming hydrochloric acid are added to the methanolic solution which is then heated to boiling for 1½ hours. The hot solvent is removed by decanting from the resulting precipitate which is washed with methanol, which contains pyridine to neutralize the hydrochloric acid. The washed polymer is dissolved in 500 cc. of a mixture of pyridine and methanol (1:1). The solution is added drop by drop to 2500 cc. of water. The precipitated anthracene aldehyde is removed by extracting the polymer acetal with petroleum ether.

The reaction of polyvinyl butyral with 9-anthracene aldehyde apparently consists in a transacetalization whereby the butyral groups are replaced, at least partly, by 9-anthracene acetal groups as shown by the following equation:

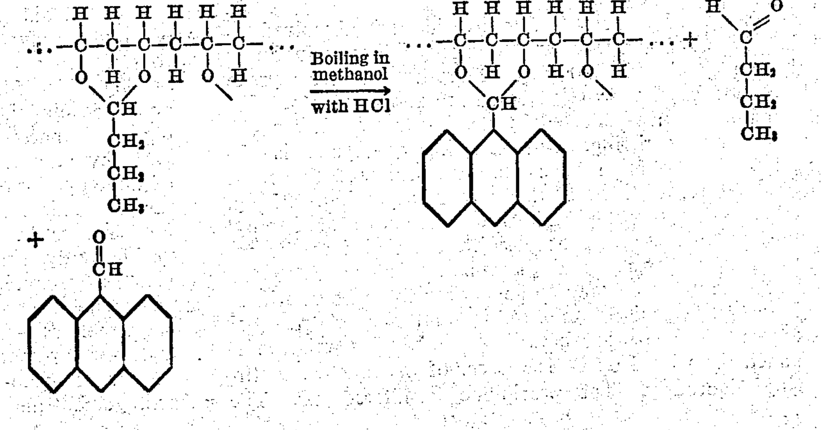

Photosensitive films are cast on metal plates in a centrifugal casting device from a 5% solution of the polymer acetal, for instance, in a mixture of chloro benzene and ethylene glycol mono-ethyl ether (1:4). Such a film when exposed to the action of an arc lamp under a negative image yields, after dissolving the non-exposed areas with the same solvent mixture, a positive image.

*Example 5*

3.52 g. of polyvinyl alcohol are suspended in 30 cc. of pyridine. 3.14 g. of acetylchloride dissolved in 10 cc. of anhydrous dioxane are added thereto drop by drop while stirring and cooling with ice. The reaction mixture is allowed to stand with stirring whereby the temperature slowly increases to room temperature. The reaction mixture is then gradually heated first to 60° C. and finally to 80° C. After heating for about 2 hours, the mixture is allowed to stand overnight. 10 g. of 2-anthracene carboxylic acid chloride and an additional 40 cc. of anhydrous dioxane and 10 cc. of pyridine are added. The reaction mixture is heated at an oil bath temperature of 120° C. for 8 hours while stirring. On cooling, a mucilaginous mass precipitates. It is filtered through cotton wool and is triturated with water. The desired polymer precipitates. It is dried, ground, and repeatedly shaken in the cold with dilute ammonia solution, washed with methanol and then with ether, and dried.

The esterification reaction taking place according to this example may be illustrated by the following equation:

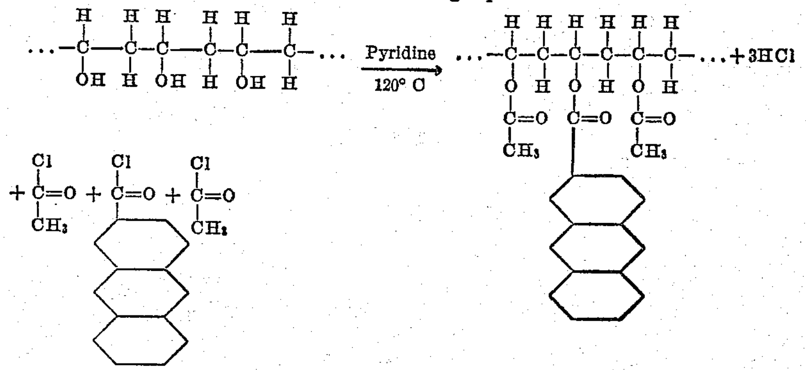

The polymer ester is dissolved in a solvent mixture consisting of 3 parts of ethylene glycol mono-methyl ether, 1 part anisole, 3 parts of chloro benzene, and 3 parts of acetophenone. A film is cast from a 4% solution in said solvent mixture on copper plates by centrifugal casting.

The same solvent mixture is used for dissolving the unexposed film areas whereby said developing solution is poured over the exposed plate in a centrifuge and is removed by centrifuging so as to avoid too long a contact with the film.

*Example 6*

103 g. of maleic acid anhydride are dissolved in 2,400 cc. of benzene while stirring. The solution is heated to 60° C. 109.5 g. of freshly distilled styrene and 1.38 g. of benzoyl peroxide are added thereto. Copolymerization is effected by heating to 80° C. for 4½ hours while stirring. The resulting copolymer is obtained in the form of a fine suspension. 800 cc. of benzene are distilled off from said suspension. 230 g. of 9-hydroxy methyl anthracene, 1,800 cc. of ethyl hexanol, and 164 cc. of pyridine are added to the remaining suspension and the mixture is heated on the steam bath for 4 hours while stirring to cause esterification. The resulting solution is diluted with an equal amount of benzine (about 3500 cc.). The mixture is added drop by drop to 10000 cc. of benzine while stirring vigorously. The precipitate is filtered off. The dried reaction product is dissolved in acetone and reprecipitated by adding the solution drop by drop to water while stirring vigorously. After drying, the polymer ester is extracted with carbon tetrachloride to remove an excess of 9-hydroxy methyl anthracene.

The esterification reaction according to this example proceeds as illustrated schematically by the following equation:

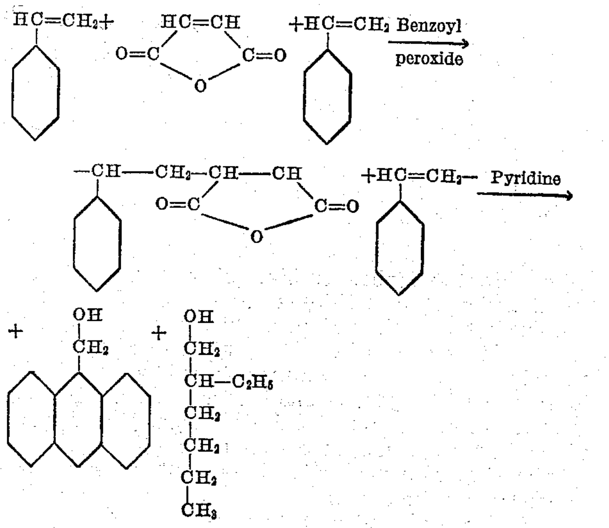

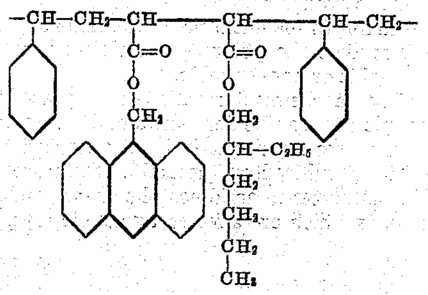

5 g. of said polymer ester are dissolved in 100 cc. of ethylene glycol mono-methyl ether. A zinc plate is coated with a thin film of said polymer by centrifugal coating. The film is exposed under a negative image and is developed by means of a solvent mixture consisting of 50 parts by volume of tetrachloro ethylene, 30 parts by volume of hexanol, and 20 parts by volume of dimethyl formamide, whereby a positive image is obtained. This image, and also the images obtained on films as described in the other examples, may be rendered visible by dyeing, for instance, with a solution of methyl violet in ethanol.

As stated hereinabove, it is, of course, possible to use other film-forming polymers with reactive groups and other aromatic or heterocyclic compounds having at least three ortho-condensed six-membered rings in linear arrangement and also reactive groups which are capable of chemically linking said polymers and said aromatic or heterocyclic compounds by reaction of said reactive groups. The reaction conditions, temperature, and duration, the solvents and solvent mixtures used for preparing and dissolving the new polymers and for developing the exposed polymer films, the methods of separating and isolating the reaction product from the reaction mixtures and of purifying and further processing the photosensitive polymers; the methods of preparing films therefrom and of exposing and developing the light-exposed films, and the like may be made by those skilled in the art in accordance with the principles set forth herein and in the claims annexed hereto.

What is claimed is:

1. A light-sensitive photographic element comprising a support, said support having two opposing surfaces, one of said surfaces being coated with a layer of a material consisting of an acetal of a polymer selected from the group consisting of polyvinyl alcohol, cellulose, and partially acetylated polyvinyl alcohol and cellulose, with a monoformyl derivative of a compound selected from the group consisting of anthracene, acridine, benzopyrene, phenazine, phenanthrophenazine, benzanthrene, and 2,9,10-trichloro anthracene, said material being the sole light-sensitive component of said element, said material being removable from said support with an organic solvent.

2. A light-sensitive photographic element comprising a support, said support having two opposing surfaces, one of said surfaces being coated with a layer of a material consisting of an acetal of partially acetylated polyvinyl alcohol and 9-anthracene aldehyde, said material being the sole light-sensitive component of said element, said material being removable from said support with an organic solvent.

3. A photographic reproduction process which comprises exposing to a pattern of light to be reproduced a supported layer of a light-sensitive material consisting of an acetal of a polymer selected from the group consisting of polyvinyl alcohol, cellulose, and partially acetylated polyvinyl alcohol and cellulose, with a monoformyl derivative of a compound selected from the group consisting of anthracene, acridine, benzopyrene, phenazine, phenanthrophenazine, benzanthrene, and 2,9,10-trichloro anthracene, said material being the sole light-sensitive component of said layer, until an insoluble image of said pattern of light has been obtained in the exposed region, and then dissolving away the material from only the unexposed region of the layer, thereby obtaining a supported layer of said insoluble image.

4. A photographic reproduction process which comprises exposing to a pattern of light to be reproduced a supported layer of a light-sensitive material consisting of an acetal of partially acetylated polyvinyl alcohol and 9-anthracene aldehyde, said material being the sole light-sensitive component of said layer, until an insoluble image of said pattern of light has been obtained in the exposed region, and then dissolving away the material from only the unexposed region of the layer, thereby obtaining a supported layer of said insoluble image.

5. A light-sensitive photographic element comprising a support, said support having two opposing surfaces, one of said surfaces being coated with a layer of a material consisting of a mixed acetal of polyvinyl alcohol, said mixed acetal having 9-anthracene aldehyde acetal groups and butyraldehyde acetal groups, said material being the sole light-sensitive layer of said element, said material being removable from said support with an organic solvent.

References Cited in the file of this patent

UNITED STATES PATENTS

| | | |
|---|---|---|
| 2,306,410 | Schnizel | Dec. 29, 1942 |
| 2,670,287 | Minsk et al. | Feb. 23, 1954 |
| 2,678,324 | Goebel | May 11, 1954 |
| 2,680,732 | Martin | June 8, 1954 |

FOREIGN PATENTS

| | | |
|---|---|---|
| 956,992 | Germany | Jan. 24, 1957 |